United States Patent
Kim et al.

(10) Patent No.: US 11,977,911 B2
(45) Date of Patent: May 7, 2024

(54) METHOD AND SYSTEM FOR AUTOMATICALLY SCALING MULTI-CONTAINER-BASED COMPUTATIONAL SESSION ON CLUSTER

(71) Applicant: LABLUP INC., Seoul (KR)

(72) Inventors: Joon Gi Kim, Seoul (KR); Jeong Kyu Shin, Seoul (KR); Jong Hyun Park, Seoul (KR)

(73) Assignee: LABLUP INC., Seoul (KR)

( * ) Notice: Subject to any disclaimer, the term of this patent is extended or adjusted under 35 U.S.C. 154(b) by 0 days.

(21) Appl. No.: 18/246,895

(22) PCT Filed: Dec. 20, 2021

(86) PCT No.: PCT/KR2021/019445
§ 371 (c)(1),
(2) Date: Mar. 28, 2023

(87) PCT Pub. No.: WO2023/106503
PCT Pub. Date: Jun. 15, 2023

(65) Prior Publication Data
US 2023/0289206 A1    Sep. 14, 2023

(30) Foreign Application Priority Data
Dec. 9, 2021    (KR) .......................... 10-2021-0175274

(51) Int. Cl.
*G06F 9/455*    (2018.01)
*G06F 9/54*    (2006.01)

(52) U.S. Cl.
CPC .......... *G06F 9/45558* (2013.01); *G06F 9/547* (2013.01); *G06F 2009/45562* (2013.01)

(58) Field of Classification Search
None
See application file for complete search history.

(56) References Cited

U.S. PATENT DOCUMENTS 10,782,990 B1*    9/2020    Suarez .................. G06F 11/301
2017/0339196 A1*    11/2017    Lewis .................. H04L 63/083
(Continued)

FOREIGN PATENT DOCUMENTS

KR              101740490 B1    5/2017
KR    10-2017-0072552 A    6/2017
(Continued)

OTHER PUBLICATIONS

Lee Yena. Multi-cluster environment computing resource-based container scheduler. Dec. 2020.
Translation of ISR for PCT/KR2021/019445, dated Nov. 3, 2022.

*Primary Examiner* — Lewis A Bullock, Jr.
*Assistant Examiner* — Melissa A Headly
(74) *Attorney, Agent, or Firm* — NKL Law; Byungwoong Park (57)    ABSTRACT

The present disclosure relates to a method for automatically scaling a multi-container-based computational session on a cluster. The method includes: receiving, by a node controller, event information and statistical information about a container from a container engine; forwarding, by the node controller, the sensed event information and statistical information to a cluster controller; determining, by the cluster controller, whether to add or delete the container for a specific session based on the received event information and statistical information; forwarding, by the cluster controller, a container addition or deletion command to the node controller of the specific session according to a determination result; and determining, by the cluster controller, whether to add or delete the node by determining whether it is impossible to add the container only with an existing node or when it is necessary to delete the container.

13 Claims, 10 Drawing Sheets

(56) References Cited

U.S. PATENT DOCUMENTS

| | | | |
|---|---|---|---|
| 2019/0250946 A1* | 8/2019 | Parameshwaran | G06F 9/5088 |
| 2020/0364086 A1* | 11/2020 | Gavali | G06F 11/3414 |
| 2021/0141655 A1* | 5/2021 | Gamage | G06F 9/45545 |
| 2021/0263780 A1 | 8/2021 | Ou et al. | |
| 2023/0062212 A1* | 3/2023 | Singh | G06F 9/5083 |
| 2023/0125765 A1* | 4/2023 | Aronovich | G06F 9/5022 |
| | | | 718/104 |

FOREIGN PATENT DOCUMENTS

| | | |
|---|---|---|
| KR | 102032521 B1 | 10/2019 |
| KR | 1020200027783 A | 3/2020 |
| KR | 10-2020-0070933 A | 6/2020 |
| KR | 1020210067415 A | 6/2021 |

\* cited by examiner

METHOD AND SYSTEM FOR AUTOMATICALLY SCALING MULTI-CONTAINER-BASED COMPUTATIONAL SESSION ON CLUSTER

TECHNICAL FIELD

The present disclosure relates to a method and system for automatically scaling a multi-container-based computational session on a cluster. In particular, the present disclosure relates to a method and system for automatically scaling a multi-container-based computational session on a cluster capable of adding and deleting nodes of the cluster itself or adding and deleting replicas of containers for each role of containers belonging to a session while performing computational workloads capable of distributed parallel processing.

BACKGROUND ART

A container is one of the techniques to run a computer program in a virtualized environment. Unlike a virtual machine that simulates a virtual physical computer, the container is a technology that virtualizes various resources within an operating system to share a single operating system while implementing the same benefit as if each program uses its own dedicated operating system. Compared to virtual machines, the isolation level between programs is somewhat lower, but it has been spotlighted in cloud and data center environments in recent years in that it has less performance overhead and makes software distribution easier by combination with an overlay file system.

A container orchestration framework refers to software that defines the amount of resources required for each service configured of containers, the number of replicas, and a network connection method (port mapping and load balancer, and routing routes between container) even when operators do not generate and delete individual containers by issuing commands when wanting to run a plurality of containers on a plurality of server nodes, and that automatically generates, deletes, and restarts containers and monitors resource usage of nodes to maintain a target state by automatically disbursing and distributing each server node upon registration.

As an existing open source container orchestration framework, Kubernetes developed and released by Google is well known. Auto-scaling techniques supported by Kubernetes, which is utilized as a defacto industry standard, are largely divided into HPA (horizontal pod auto-scaling) and VPA (vertical pod auto-scaling), which provides a function that automatically adjusts the amount of computational resources allocated to the cluster and 'pod,' which is the basic execution unit. The 'pod' corresponds to the concept of "session" mentioned in this specification, and is an execution unit that bundles containers with many different roles. For example, it may be possible to define a "web service" pod that bundles a web server container and a DB container. HPA adjusts the amount of allocated computational resources by replicating a plurality of pods and adjusting the number of replicas, and VPA provides a function that automatically changes the capacity of CPU and memory within a specified range while the pod is running. For example, the memory capacity allocated to a container is automatically increased when an OOM (out-of-memory) event is sensed. The function to change the CPU and memory allocations of individual containers during execution is presently supported by the "docker update" command in Docker, and Kubernetes also provides support in the same way.

The related art includes Korean Patent Application Publication No. 10-2020-0070933 (Dynamic Resource Scaling Device in Network Function Virtualization Environment and Method Thereof), which merely discloses a dynamic resource scaling method in a network function virtualization environment in which resources are shared among virtual network functions (VNFs) operated in the same server by changing the virtualization environment to a container-based environment.

DISCLOSURE

Technical Problem

An aspect of the present disclosure is directed to providing a method and system for automatically scaling a multi-container-based computational session on a cluster capable of adding and deleting nodes of the cluster itself or adding and deleting replicas of containers for each role of containers belonging to a session, unlike the HPA technology that adds and deletes replicas of sessions and the VPA technology that adjusts the CPU/memory allocation of individual containers.

Technical Solution

According to an embodiment of the present disclosure, a method for automatically scaling a multi-container-based computational session on a cluster includes: receiving, by a node controller, event information and statistical information about a container from a container engine; forwarding, by the node controller, the sensed event information and statistical information to a cluster controller; determining, by the cluster controller, whether to add or delete the container for a specific session based on the received event information and statistical information; and forwarding, by the cluster controller, a container addition or deletion command to the node controller of the specific session according to a determination result. In addition, the method further includes: forwarding, by the node controller of the specific session, the container addition or deletion command to the container engine; and executing, by the container engine, a container addition or deletion.

In addition, the method further includes: forwarding, by the cluster controller, container changes to all node controllers; and forwarding, by each node controller, the container changes to each container agent.

The method further includes: executing, by the container agent, a script or callback function registered by a user process in advance to forward the container changes to the user process; including, by the user process, a container added according to the container changes in a computational task or excluding a deleted container.

According to another embodiment of the present disclosure, a method for automatically scaling a multi-container-based computational session on a cluster includes: receiving, by an API handler, an API request for adding or deleting a container for a specific session and forwarding the same to a cluster controller; determining, by the cluster controller, whether to add or delete the container for the specific session; and forwarding, by the cluster controller, a container addition or deletion command to a node controller of the specific session according to a determination result. In addition, the method further includes: forwarding, by the node controller of the specific session, the container addition or deletion command to the container engine; and executing, by the container engine, a container addition or deletion. In addition, the method further includes: determining, by the cluster controller, whether to add or delete a node; and determining, by the cluster controller, whether to add or delete the node by determining whether it is impossible to add the container only with an existing node or when it is necessary to delete the container.

Advantageous Effects

According to an embodiment of the present disclosure, when the amount of computation required increases or decreases while performing a computational workload capable of distributed parallel processing, it is possible to reduce the performance time of the computational workload and reduce the waste of resources unnecessarily occupied.

DESCRIPTION OF DRAWINGS

The accompanying drawings, which are included to provide a further understanding of the present disclosure and are incorporated into and constitute a part of this specification, illustrate embodiments of the present disclosure and together with the description serve to explain the principles of the present disclosure.

MODE FOR DISCLOSURE

As specific structural or functional descriptions for the embodiments according to the concept of the present disclosure disclosed herein are merely exemplified for purposes of describing the embodiments according to the concept of the present disclosure, the embodiments according to the concept of the present disclosure may be embodied in various forms and are not limited to the embodiments described herein.

While the embodiments of the present disclosure are susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure.

The terms used herein are presented for the description of the specific embodiments but are not intended to limit the present disclosure. The terms in singular form may include plural forms unless otherwise specified. It will be understood that the terms "comprising" or "having," when used herein, specify the presence of stated features, integers, steps, operations, elements, components, or combinations thereof, but do not preclude the presence or addition of one or more other features, integers, steps, operations, elements, components, and/or combinations thereof.

As used herein, the term "cluster" means that several computers (server nodes) are grouped into a single network. Herein, a single network may be a LAN based on various L2/L3 packet protocols such as Ethernet or Infiniband, and may also be a network that is physically distributed in separate spaces but is grouped together to appear as one using a VPN or network tunneling software. Nodes belonging to the same network can communicate directly without passing through a separate firewall.

The term "cluster controller" refers to a daemon that receives and processes a request such as session generation, deletion, and code execution from a user in the form of an API, monitors the resource availability, allotment, and usage of the nodes in the cluster, and relays session generation and deletion requests requested through a scheduler so that the requests are actually performed by calling a node controller or selecting a node according to the resource status of the node.

The term "node controller" refers to a daemon that is installed on each node of the cluster and calls a container engine of the node to generate and delete actual containers, and that reports to the cluster controller when the resource allocation of the current node changes due to such actions and lifecycle activities of the containers (such as automatically completing due to errors or task completion).

The term "container engine" refers to a daemon-type independent software that provides a container control interface in an API form.

The term "container agent" refers to a small daemon that executes a user code, runs an application inside a container, and monitors an inside of the container under the control of a node controller. Inside the container, the same authority as a user process is used for execution.

The term "session" is a basic unit in which a user executes independent computational tasks. One session is essentially composed of at least one container, and user does not generate or delete individual containers, but commands to generate or delete sessions, and generates and deletes the containers that the cluster controller and node controller actually need.

A structure that abstracts a plurality of containers into one computational session may be implemented utilizing an overlay network, and is divided into single node and multi-node cases. A single node is utilized as a local bridge network, and multi-nodes are utilized as a virtual overlay network. The implementation of the overlay network may either use a high-level abstraction such as docker swarm, directly manipulate the Linux kernel's netfliter (iptables) settings, or manipulate the kernel's routing table using the netlink kernel API.

The hostname and SSH-related settings are automatically applied to the containers of the actually generated session so that they may recognize each other in the same way regardless of whether they are for single node or multi-node.

With the session template function, containers belonging to one session are divided by role, and the resource allocation amount, image to be used, and number to be replicated may be different. At least one main container needs to be present. When adding a single node cluster session container, the cluster controller may search the available resources of the node to which the corresponding session belongs, and may newly register an interface belonging to the network namespace of the container in the local bridge network. A container may be generated on the node to which the session belongs.

When adding a multi-node cluster session container, the cluster controller may search the available resources of the resource group to which the corresponding session belongs and create a list of node controllers that may be allocated, may newly register the network namespace of the container in the overlay network, and may generate a plurality of containers on the allocated node.

Hereinafter, embodiments of the present disclosure will be described in detail with reference to the accompanying drawings.

Figure 1:
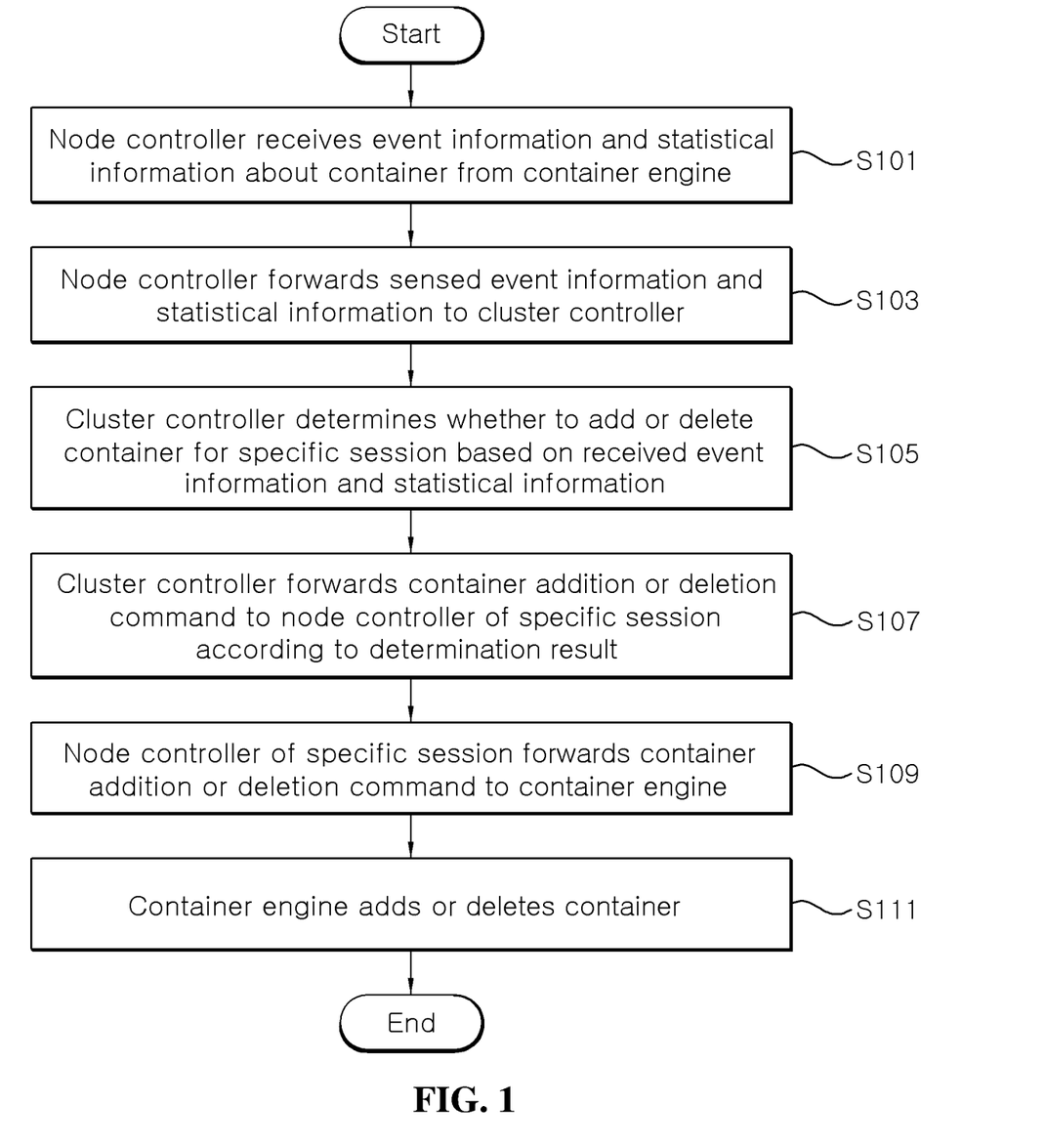
FIGS. 1 and 2 are diagrams illustrating a method for automatically scaling a multi-container-based computational session on a cluster according to an embodiment of the present disclosure.
Figure 2:
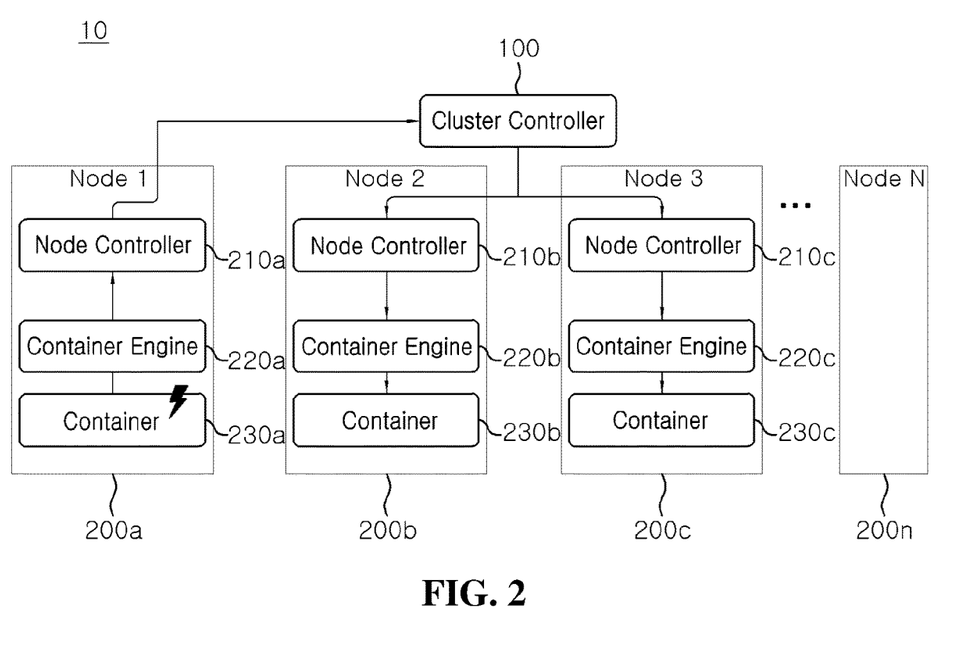

FIGS. 1 and 2 are diagrams illustrating a method for automatically scaling a multi-container-based computational session on a cluster according to an embodiment of the present disclosure.

Referring to FIGS. 1 and 2, in the method for automatically scaling a multi-container-based computational session on a cluster according to an embodiment of the present disclosure, first, a node controller 210a receives event information and statistical information about a container 230a from a container engine 220a (S101). The event information about the container may be a computational resource shortage event such as an OOM (out-of-memory) event, but is not limited thereto. The statistical information may be computational resource usage statistics, but is not limited thereto. The container engine 220a may sense the event information and statistical information in real time and forward the same to the node controller 210a. The host operating system of the node together with the container engine 220a may sense the event information and statistical information in real time.

The node controller 210a forwards the sensed event information and statistical information to the cluster controller 100 (S103). The event information is generated when an event such as OOM(out-of-memory) occurs more than a specific number of times in one session. The statistical information is generated when the average CPU usage rate or GPU usage rate exceeds a certain level by checking sessions at specific intervals. For example, sessions are checked once every 5 minutes. When the average CPU usage rate or GPU usage rate for the last one minute exceeds 85%, the number of containers with the same resource allocation may be added by one. When the average CPU usage rate or GPU usage rate for the last one minute does not exceed 30%, the number of containers may be reduced by one. In this connection, the number of containers may be limited according to the settings, and at least one needs to be maintained.

The cluster controller 100 determines whether to add or delete a container for a specific session based on the received event information and statistical information (S105). The cluster controller 100 determines whether to add or delete a container in consideration of whether it is necessary to add or delete a container for a specific session by analyzing the received event information and statistical information, whether the specific session and an owner of the specific session has the authority to make the corresponding decision, and whether there are enough resources that may actually be performed in the specific session.

The cluster controller forwards a container addition or deletion command to a node controller 210b of a specific session according to a determination result (S107). The node controller 210b of the specific session forwards the container addition or deletion command to the container engine 220b (S109). Upon receiving the command, the container engine 220b adds or deletes a container 230b (S111).

Thereafter, the cluster controller determines whether to add or delete nodes. It is determined whether container addition is impossible only with the existing node, and whether to add the node is determined according to the manager setting that defines the maximum number of allowed nodes and the specification options of a new node. The cluster controller determines when container deletion is necessary and determines whether to delete the node according to the manager setting that defines the minimum number of nodes to be maintained.

In other words, the system 10 for automaticcally scaling a multi-container-based computational session on a cluster is configured of the cluster controller 100 and a plurality of nodes 200a, 200b, 200c, . . . , 200n. The first node 200a is configured of a first node controller 210a, a first container engine 220a, and a first container 230a; the second node 200b is configured of a second node controller 210b, a second container engine 220b, and a second container 230b; and the third node 200c is configured of a third node controller 210c, a third container engine 220c, and a third container 230c. When an event occurs in the container of the first node 200a and the node controller 210a forwards the sensed event information and statistical information to the cluster controller 100, the cluster controller 100 determines whether a container of a specific session may be added based on the event information and statistical information. For example, when the container of the second node is able to be added, a command may be forwarded to the node controller of the second node 200b to add the container.

Figure 3:
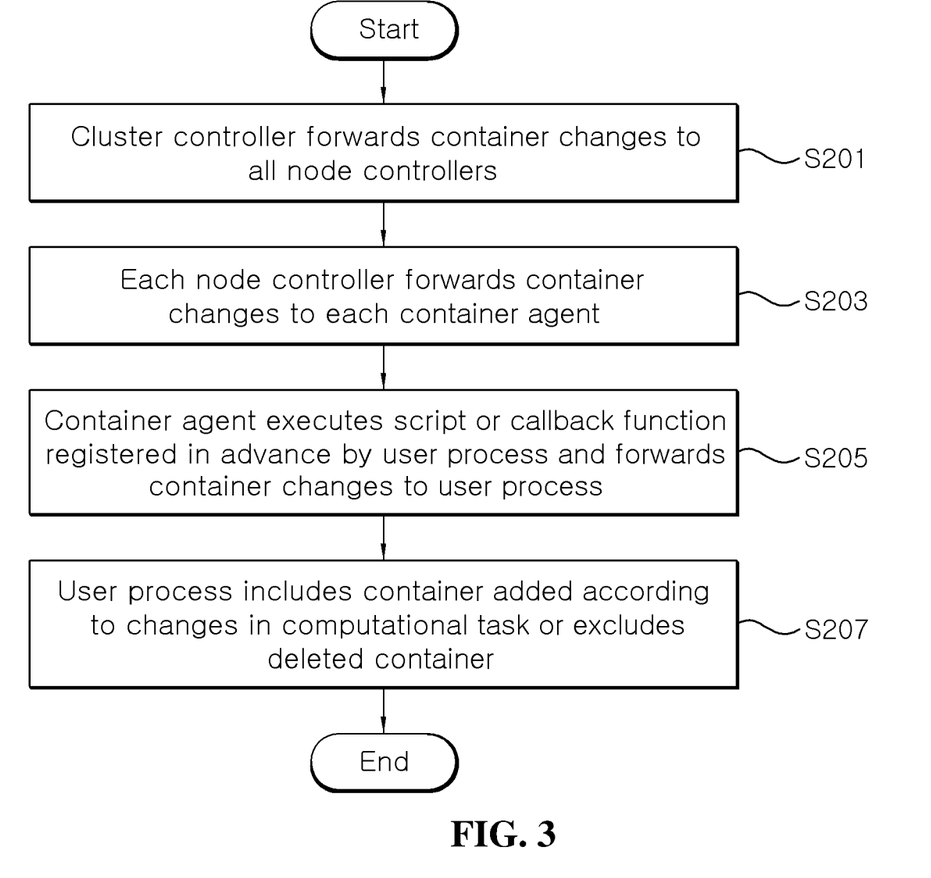
FIGS. 3 and 4 are diagrams illustrating a method of notifying changes to existing containers according to an embodiment of the present disclosure.
Figure 4:
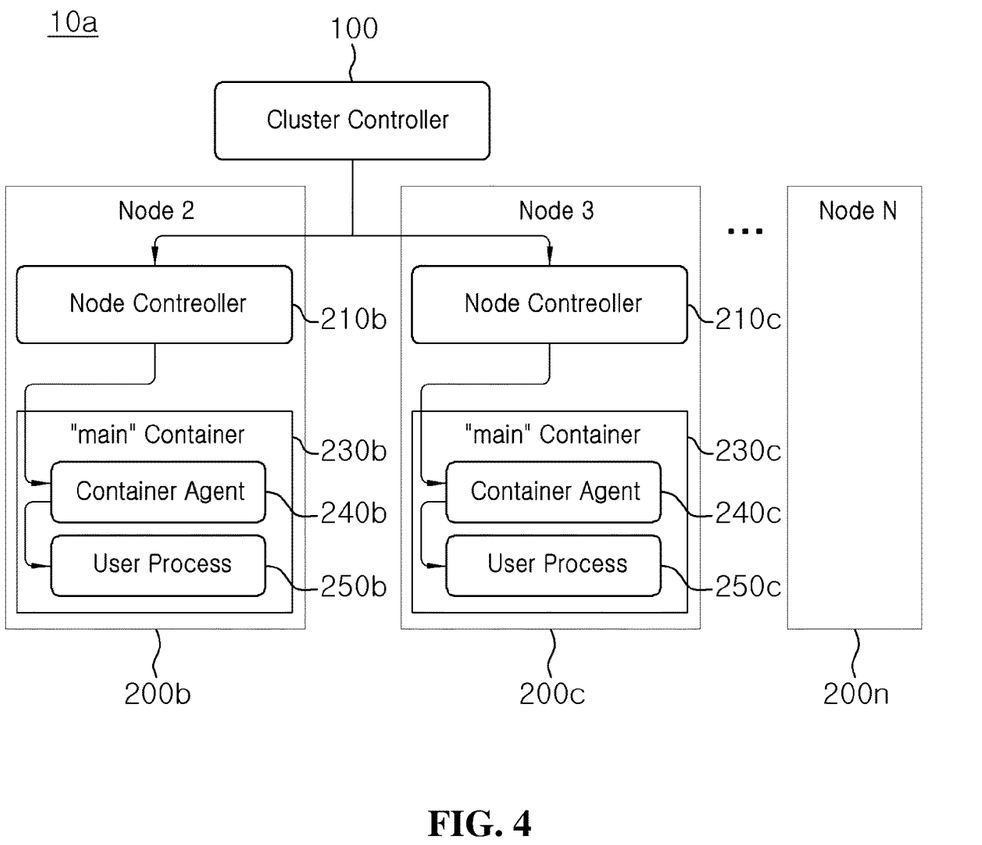

FIGS. 3 and 4 are diagrams illustrating a method of notifying changes to existing containers according to an embodiment of the present disclosure.

Referring to FIGS. 3 and 4, the cluster controller forwards container changes to all node controllers (S201). The changes relate to the addition or deletion of containers. When the cluster controller determines to add or delete containers in a specific session, the cluster controller notifies the node controllers of all existing nodes on which containers belonging to a specific session are executing that a container is added or deleted. In addition, the cluster controller may make a remote procedure call (RPC) to the node controller over the network or issue the corresponding fact to a separate event broker node in the form of an event, and may also use an event bus method that uses an API to receive an event from the node.

Each node controller forwards container changes to each container agent (S203). The container agent executes a script or callback function registered in advance by the user process and forwards the container changes to the user process (S205).

The user process includes a container added according to the container changes in a computational task or excludes a deleted container (S207). In the process of adding or deleting the container through the above process, existing containers belonging to the session may be notified of the fact of addition or deletion.

In the system 10a for automatically scaling a multi-container-based computational session on a cluster, a container agent 240b and a user process 250b in a main container 230b among a plurality of containers may forward container changes.

Figure 5:
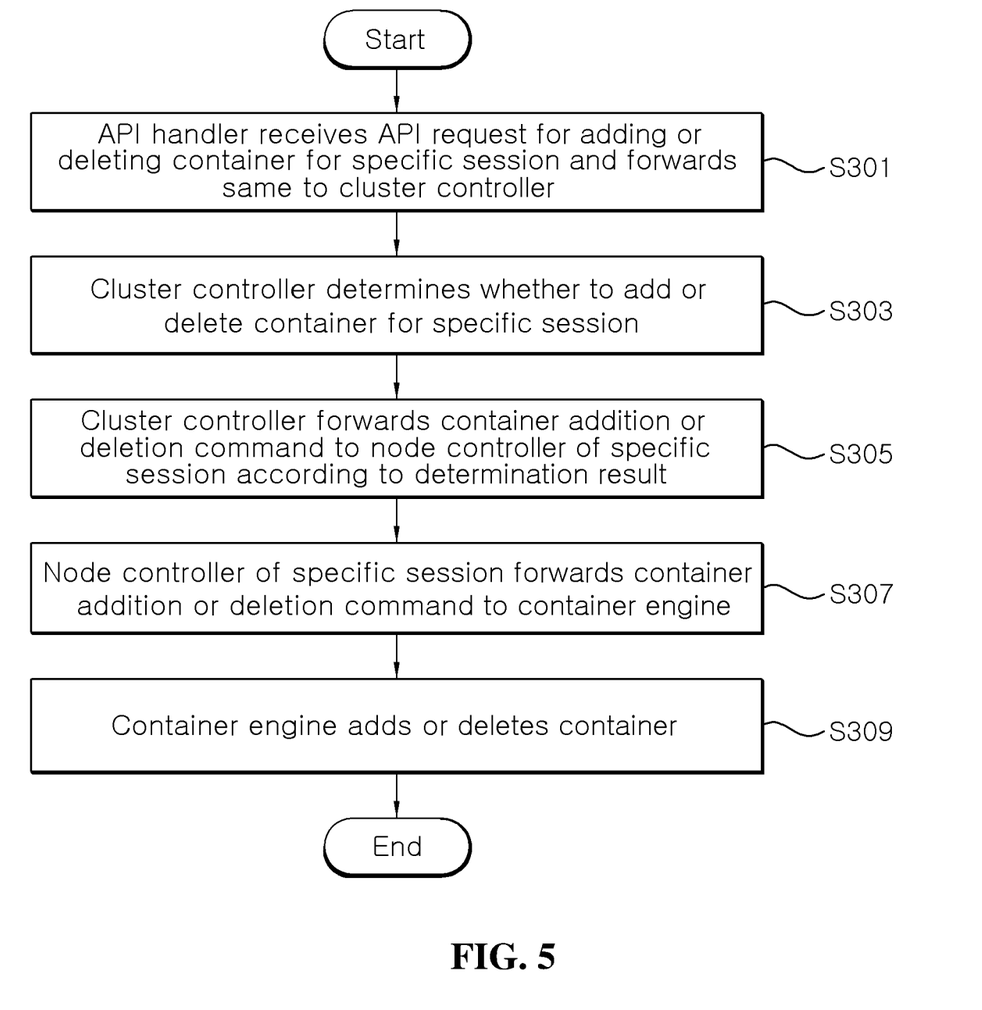
FIGS. 5 and 6 are diagrams illustrating a method for automatically scaling a multi-container-based computational session on a cluster according to another embodiment of the present disclosure.
Figure 6:
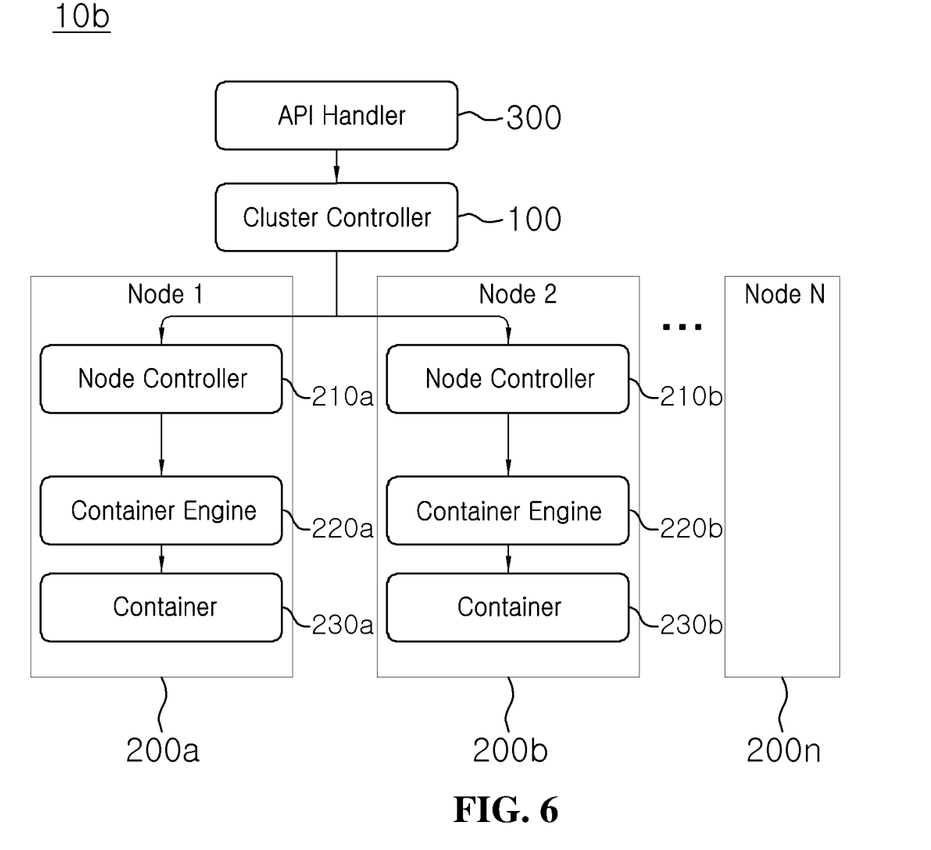

FIGS. 5 and 6 are diagrams illustrating a method for automatically scaling a multi-container-based computational session on a cluster according to another embodiment of the present disclosure.

Referring to FIGS. 5 and 6, in a method for automatically scaling a multi-container-based computational session on a cluster according to another embodiment of the present disclosure, the API handler receives an API request for adding or deleting a container for a specific session and forwards the same to the cluster controller (S301). The API handler may receive an API request for adding or deleting a container for a specific session at the request of a user or administrator.

The cluster controller determines whether to add or delete a container for a specific session (S303). The cluster controller 100 determines whether to add or delete a container in consideration of whether it is necessary to add or delete a container for a specific session by receiving the API, whether the specific session and an owner of the specific session has the authority to make the corresponding decision, and whether there are enough resources that may actually be performed in the specific session.

The cluster controller forwards a container addition or deletion command to the node controller of the specific session according to a determination result (S305). The node controller of the specific session forwards a container addition or deletion command to the container engine (S307). The container engine adds or deletes a container (S309). The container may be changed by a request for adding or deleting a container from a user terminal or an administrator terminal.

In other words, a system 10*b* for automatically scaling a multi-container-based computational session on a cluster is configured of the cluster controller 100, a plurality of nodes 200*a*, 200*b*, 200*c*, . . . , 200*n*, and an API handler 300. The API handler 300 may receive an API request for adding or deleting a container for a specific session according to a request of a user terminal or an administrator terminal, and forward the same to the cluster controller 100.

Figure 7:
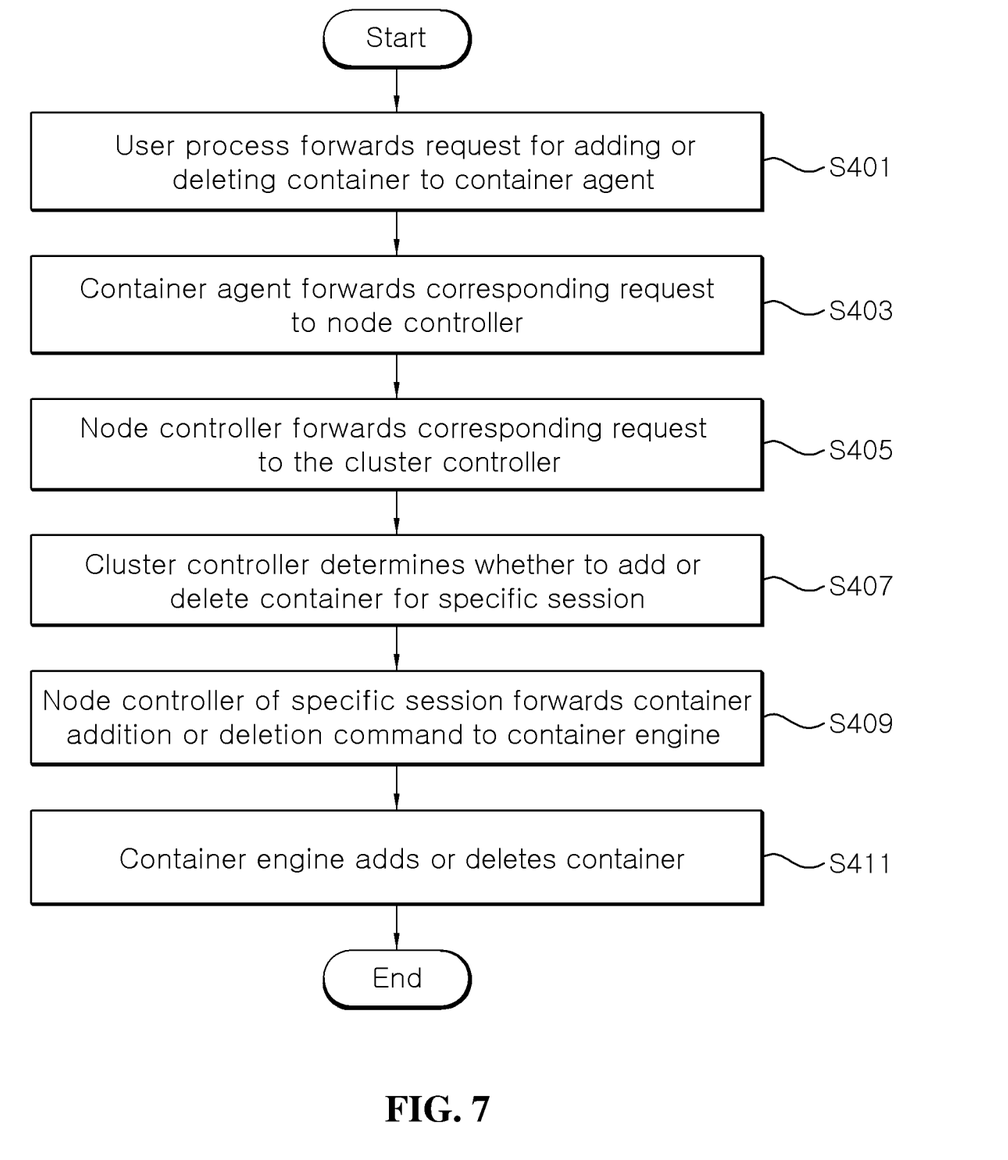
FIGS. 7 and 8 are diagrams illustrating a method for automatically scaling a multi-container-based computational session on a cluster according to yet another embodiment of the present disclosure.
Figure 8:
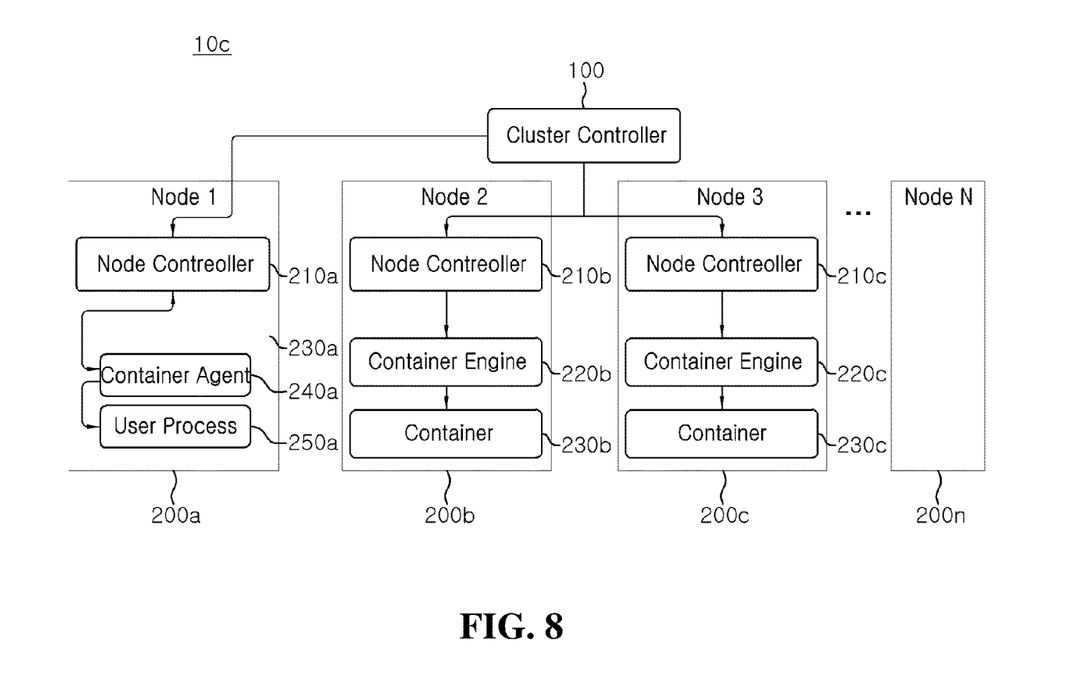

FIGS. 7 and 8 are diagrams illustrating a method for automatically scaling a multi-container-based computational session on a cluster according to yet another embodiment of the present disclosure.

Referring to FIGS. 7 and 8, the user process forwards a request for adding or deleting a container to the container agent (S401). The user process may forward the request for adding or deleting a container to the container agent at its own determination.

The container agent forwards the corresponding request to the node controller (S403). By combining one or more of a way in which the node controller uses a UNIX domain socket that is automatically mounted and provided when a container is generated, a way in which the node controller intercepts access to a private IP address such as 169.254.169.254 inside a container, and a way in which the container agent connects to the TCP port open in the local host inside the container, and the container agent communicates with the node controller by the method, the user process (A), the container agent (B), and the node controller C may utilize the application protocol such as ZeroMQ, HTTP, and web sockets to communicate with each other bi-directionally (A↔B, B↔C↔C, and A↔C are all possible). When the user process sends a corresponding request, an authentication key is planted at the time of container generation so that the node controller may determine which container it belongs to, or the node controller has logic to determine which container it belongs to based on a source IP address of the request, thereby making it possible to discriminate whether the request is permissible. In other words, existing cloud services also provide metadata API services through private IP addresses such as 169.254.169.254 for virtual machines, but an embodiment of the present disclosure is different in that a similar mechanism is applied to containers rather than virtual machines.

The node controller forwards the corresponding request to the cluster controller (S405). In addition, it may be used in an event bus method or a method in which the node controller makes a direct remote procedure call (RPC) to the cluster controller.

The cluster controller determines whether to add or delete a container for a specific session (S407). The cluster controller 100 determines whether to add or delete a container in consideration of whether it is necessary to add or delete a container for a specific session, whether the specific session and an owner of the specific session has the authority to make the corresponding decision, and whether there are enough resources that may actually be performed in the specific session.

The node controller of the specific session forwards a container addition or deletion command to the container engine (S409). The container engine adds or deletes a container (S411). In other words, the user process may add or delete a container at its own determination.

In other words, a system 10*c* for automatically scaling a multi-container-based computational session on a cluster is configured of the cluster controller 100 and a plurality of nodes 200*a*, 200*b*, 200*c*, . . . , 200*n*. The first node 200*a* is configured of the first node controller 210*a*, a first main container 230*a*, a first container agent 240*a*, and a user process 250*a*. The user process 250*a* forwards a request for adding or deleting a container to the container agent so that the container may be changed.

Figure 9:
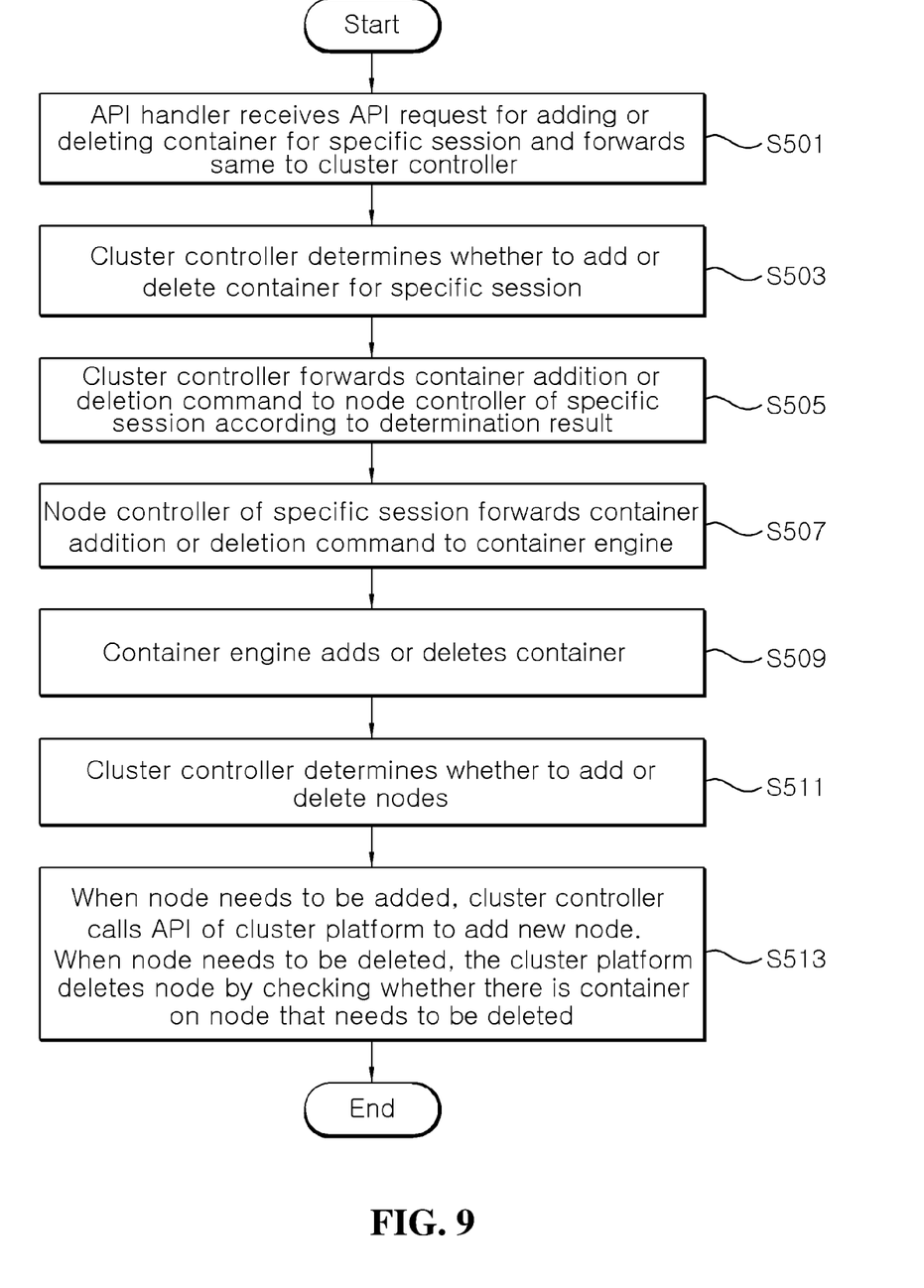
FIGS. 9 and 10 are diagrams illustrating an automatic scaling method of adding or deleting a node of a cluster itself according to yet another embodiment of the present disclosure.
Figure 10:
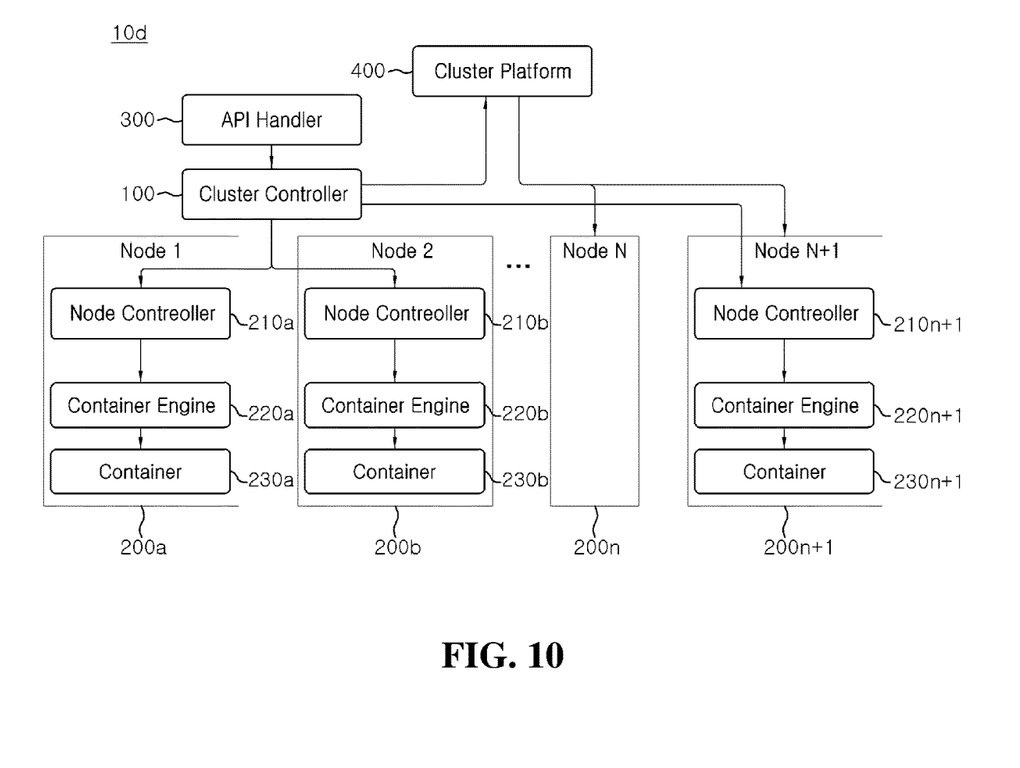

FIGS. 9 and 10 are diagrams illustrating an automatic scaling method of adding or deleting a node of a cluster itself according to yet another embodiment of the present disclosure.

Referring to FIGS. 9 and 10, the API handler receives an API request for adding or deleting a container for a specific session and forwards the same to the cluster controller (S501). The API handler may receive an API request for adding or deleting a container for a specific session at the request of a user or administrator.

The cluster controller determines whether to add or delete a container for a specific session (S503). The cluster controller 100 determines whether to add or delete a container in consideration of whether it is necessary to add or delete a container for a specific session by receiving the API, whether the specific session and an owner of the specific session has the authority to make the corresponding decision, and whether there are enough resources that may actually be performed in the specific session.

The cluster controller forwards a container addition or deletion command to the node controller of the specific session according to a determination result (S505). The node controller of the specific session forwards a container addition or deletion command to the container engine (S507). The container engine adds or deletes a container (S509). The container may be changed by a request for adding or deleting a container from a user terminal or an administrator terminal.

Thereafter, the cluster controller determines whether to add or delete nodes (S511). It is determined whether container addition is impossible only with the existing node, and whether to add the node is determined according to the manager setting that defines the maximum number of allowed nodes and the specification options of a new node. The cluster controller determines when container deletion is necessary and determines whether to delete the node according to the manager setting that defines the minimum number of nodes to be maintained.

When a node needs to be added, the cluster controller calls the API of a cluster platform 400 to add a new node 200n+1. When anode needs to be deleted, the cluster platform 400 deletes the node by checking whether there is a container on the node that needs to be deleted (S513). When a node needs to be deleted, the scheduling of new containers is blocked by checking whether there are containers running on one or more nodes, and is either on standby or forcibly shut down through the node controller.

In other words, an automatic scaling system 10d for adding or deleting a node of a cluster on the cluster is configured of the cluster controller 100, a plurality of nodes 200a, 200b, 200c, . . . , 200n, the API handler 300, and the cluster platform 400. The API handler 300 may receive an API request for adding or deleting a container for a specific session according to a request of a user terminal or an administrator terminal, and forward the same to the cluster controller 100. The cluster platform 400 adds or deletes a node by receiving whether the node is added or deleted from the cluster controller. Specifically, the cluster controller marks the corresponding node as being deleted and no longer allocates new containers. In the case of a batch session, the cluster controller waits for the task to be completed according to the administrator's setting or deletes the corresponding node after forcibly shutting down after a certain period of time. In the case of an interactive session, the cluster controller waits until it is shut down by a user according to the administrator's setting, or sends a warning to the user of the container, and after a certain period of time, is forcibly shut down, and then deletes the corresponding node. When there are no running containers, the corresponding node is immediately deleted. In other words, the automatic scaling of the existing cloud operates under the assumption that the requested task of a user takes only a very short time and the node may be stopped at any time. In an embodiment of the present disclosure, since the task of an individual container is performed for a very long time, it is difficult to arbitrarily stop and support the case where the assumption is not established.

While the present disclosure has been described in connection with the exemplary embodiments illustrated in the drawings, they are merely illustrative and the present disclosure is not limited to these embodiments. It will be appreciated by a person having an ordinary skill in the art that various equivalent modifications and variations of the embodiments can be made without departing from the spirit and scope of the present disclosure. Therefore, the true technical scope of the present disclosure should be defined by the technical spirit of the appended claims.

The invention claimed is:

1. A method for automatically scaling a multi-container-based computational session on a cluster, wherein the cluster comprises a cluster controller, the method comprising:
   initiating a plurality of sessions on a plurality of nodes by the cluster controller, wherein each of the plurality of nodes comprise a node controller and a container engine, each session of the plurality of sessions executes one or more containers on a respective container engine of the plurality of nodes, and each container comprises a respective container agent and one or more user processes;
   for each respective node controller executing on the plurality of nodes:
      receiving, by a respective node controller executing on a respective node, event information and statistical information about at least one container executing on the respective node from a container engine executing on the respective node, wherein event information comprises:
         at least computational resource shortage events and statistical information comprises resource usage statistics;
         the event information is generated when a predetermined event occurs, the predetermined event including an OOM (out-of-memory) event which occurs more than a specific amount of times in one session;
         the statistical information is generated when an average CPU usage rate or an average GPU usage rate of a respective node of the plurality of nodes exceeds a predetermined threshold; and
         the event information and statistical information are sent by each container engine running on each node of the plurality of nodes; and
      forwarding, by the respective node controller, the received event information and statistical information to the cluster controller at predetermined intervals;
   based on the forwarding, determining, by the cluster controller, to add or delete one or more containers of a specific session of the plurality of sessions;
   forwarding, by the cluster controller, a container addition or deletion command to a first node controller associated with the specific session and executing on a first node of the plurality of nodes associated with the first node controller according to a result of the determining;
   forwarding, by the first node controller, the container addition or deletion command to a first container engine executing on the first node;
   executing container changes, by the first container engine, based on the container addition or deletion command;
   determining, by the cluster controller, one or more nodes of the plurality of node s, other than the first node, that execute containers belonging to the specific session;
   forwarding, by the cluster controller, the container changes to a respective node controller of the one or more nodes; and
   forwarding, by each respective node controller, the container changes to an associated container agent.

2. The method of claim 1, further comprising:
   for each container agent executing on the plurality of nodes:
      executing, by a respective container agent, a script or callback function registered by a user process in advance to forward the container changes to the user process; and
      including, by the user process, a container added according to the container changes in a computational task or excluding a deleted container.

3. The method of claim 1, wherein:
   the plurality of nodes are grouped into a single network;
   the cluster controller receives and processes a request which includes a session generation, a session deletion, and a code execution,
   the cluster controller monitors a resource availability, a resource allotment, an d an usage of the nodes in the cluster, and the cluster controller relays session generation and deletion requests so that the requests are actually performed by calling a node controller or selecting a node according to a resource status of the node.

4. The method of claim 1, wherein each respective container agent monitors an associated container under a control of an associated node controller.

5. The method of claim 1, wherein a session of the plurality of sessions is a basic unit in which a user executes independent computational tasks, each session of the plurality of sessions is composed of at least one container.

6. The method of claim 1, wherein when an average CPU usage rate or an average GPU usage rate for a session of the plurality of sessions is less than 30%, a number of containers with an on-going resource allocation and associated with the session is decreased by one while maintaining at least one container on a respective node of the plurality of nodes that is executing the session.

7. A method for automatically scaling a multi-container-based computational session on a cluster, wherein the cluster comprises a cluster controller, the method comprising:
  initiating a plurality of sessions on a plurality of nodes by the cluster controller, wherein each of the plurality of nodes comprise a node controller and a container engine, each session of the plurality of sessions executes one or more containers on a respective container engine of the plurality of nodes, and each container comprises a respective container agent and one or more user processes;
  for each respective node controller executing on the plurality of nodes:
    receiving, by a respective node controller executing on a respective node, event information and statistical information about at least one container executing on the respective node from a container engine executing on the respective node, wherein event information comprises:
      at least computational resource shortage events and statistical information comprises resource usage statistics;
      the event information is generated when a predetermined event occurs, the predetermined event including an OOM (out-of-memory) event which occurs more than a specific amount of times in one session;
      the statistical information is generated when an average CPU usage rate or an average GPU usage rate of a respective node of the plurality of nodes exceeds a predetermined threshold; and
      the event information and statistical information are sent by each container engine running on each node of the plurality of nodes; and
    forwarding, by the respective node controller, the received event information and statistical information to the cluster controller at predetermined intervals;
  receiving, by the cluster controller, a request for a container or deletion for a specific session from a first container agent running on a first node of the plurality of nodes;
  determining, by the cluster controller, whether to add at least one container or delete at least one container for the specific session based on the request and the received event information and statistical information;
  in response to determining to add or delete at least one container, forwarding, by the cluster controller, a container addition or deletion command to a first node controller running on the first node;
  forwarding, by the first node controller, the container addition or deletion command to a first container engine running on the first node;
  executing container changes, by the first container engine, based on the container addition or deletion command;
  determining, by the cluster controller, one or more nodes of the plurality of nodes, other than the first node, that execute containers belonging to the specific session;
  forwarding, by the cluster controller, the container changes to a respective node controller of the one or more nodes; and
  forwarding, by each respective node controller, the container changes to an associated container agent.

8. The method of claim 7, further comprising:
  determining, by the cluster controller, whether to add or delete a node; and
  determining, by the cluster controller, whether to add or delete the node by determining whether it is impossible to add at least one container only with an existing node or when it is necessary to delete at least one container.

9. The method of claim 7, further comprising:
  for each container agent executing on the plurality of nodes:
    executing, by a respective container agent, a script or callback function registered by a user process in advance to forward the container changes to the user process; and
    including, by the user process, a container added according to the container changes in a computational task or excluding a deleted container.

10. The method of claim 7, wherein:
  the plurality of nodes are grouped into a single network;
  the cluster controller receives and processes a request which includes a session generation, a session deletion, and a code execution,
  the cluster controller monitors a resource availability, a resource allotment, an d an usage of the nodes in the cluster, and
  the cluster controller relays session generation and deletion requests so that the requests are actually performed by calling a node controller or selecting a node according to a resource status of the node.

11. The method of claim 7, wherein each respective container agent monitors an associated container under a control of an associated node controller.

12. The method of claim 7, wherein a session of the plurality of sessions is a basic unit in which a user executes independent computational tasks, each session of the plurality of sessions is composed of at least one container.

13. The method of claim 7, wherein when an average CPU usage rate or an average GPU usage rate for a session of the plurality of sessions is less than 30%, a number of containers with an on-going resource allocation and associated with the session is decreased by one while maintaining at least one container on a respective node of the plurality of nodes that is executing the session.

* * * * *